US012774941B2

(12) United States Patent
Martinez et al.

(10) Patent No.: US 12,774,941 B2
(45) Date of Patent: Oct. 27, 2026

(54) METHOD FOR BORING A CYLINDRICAL SAMPLE FROM 3D-PRINTED STRUCTURE

(71) Applicant: ARAMCO SERVICES COMPANY, Houston, TX (US)

(72) Inventors: Rolando F. Martinez, Katy, TX (US); Kenneth Dejuan Johnson, Tomball, TX (US); Ali Zein Khater, Pearland, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 1058 days.

(21) Appl. No.: 17/703,929

(22) Filed: Mar. 24, 2022

(65) Prior Publication Data

US 2023/0304900 A1 Sep. 28, 2023

(51) Int. Cl.
*G01N 1/08* (2006.01)
*B33Y 40/00* (2020.01)

(52) U.S. Cl.
CPC ................ *G01N 1/08* (2013.01); *B33Y 40/00* (2014.12)

(58) Field of Classification Search
CPC .................................. G01N 1/08; B33Y 40/00
USPC .......................................................... 434/296
See application file for complete search history.

(56) References Cited

U.S. PATENT DOCUMENTS 4,276,253 A * 6/1981 Adler, Sr. ................ G01N 1/36 434/296
2007/0102198 A1* 5/2007 Oxford ................... B22F 7/062 175/374
2008/0156148 A1* 7/2008 Smith ....................... B22F 7/06 76/102
2009/0008142 A1* 1/2009 Shimizu ................. H05K 1/036 428/209
2010/0187018 A1* 7/2010 Choe ....................... C22C 19/00 175/426
2023/0304900 A1* 9/2023 Martinez ................ G01N 1/286

FOREIGN PATENT DOCUMENTS

CN 108372571 A 8/2018
CN 209372525 U 9/2019
CN 110907253 A 3/2020
CN 112345334 A 2/2021

(Continued)

OTHER PUBLICATIONS

First Examination Report issued in corresponding Saudi Arabian Application No. 123446777; dated Apr. 16, 2024 (6 pages).

(Continued)

*Primary Examiner* — Xuan M Thai
*Assistant Examiner* — Lisa H Antoine
(74) *Attorney, Agent, or Firm* — Osha Bergman Watanabe & Burton LLP

(57) ABSTRACT

A method to support a structure for boring and subsequent characterization tests which includes selecting and preparing a casting material, placing the structure, with a structure height, into the casting material which possesses a base side and a casting material height, and allowing for the casting material to set, creating a cast sample with a shape. The method further includes inserting the cast sample into a boring apparatus, boring and extracting a cylindrical specimen from the cast sample, and performing characterization test on the extracted specimen.

16 Claims, 4 Drawing Sheets

(56) References Cited

FOREIGN PATENT DOCUMENTS

| | | | | | | |
|---|---|---|---|---|---|---|
| EP | 3311157 | B1 | | 3/2022 | | |
| GB | 2345930 | A | * | 7/2000 | ............. | E21B 10/55 |
| JP | 2014111372 | A | | 6/2014 | | |
| WO | WO-2017023603 | A1 | * | 2/2017 | ............. | C22C 21/00 |
| WO | WO-2021158819 | A1 | * | 8/2021 | ............. | E21B 10/54 |

OTHER PUBLICATIONS

Sajadi, Seyed Mohammad et al., "Direct Ink Writing of Cement Structures Modified with Nanoscale Additive", Adv. Eng. Mater., 1801380, 2019 (10 pages).

Sajadi, Seyed Mohammad et al., "Deformation resilient cement structures using 3D-printed molds", iScience, vol. 24 (3), 102174, 2021 (20 pages).

* cited by examiner

METHOD FOR BORING A CYLINDRICAL SAMPLE FROM 3D-PRINTED STRUCTURE

BACKGROUND

To properly characterize a material, evaluate material mechanical properties, and compare said material properties to the properties of other materials, standardized characterization tests are commonly employed. Typically, the standard comprises specifications for the material specimen shape and dimension, the testing apparatus, and testing method. For example, to study the effects of various constituents and additives on the integrity of a material like cement, mechanical cycling tests are used. The American Society for Testing and Materials (ASTM) standard for such cyclical tests on a cementitious specimen may require the specimen to be cylindrical with a diameter of one inch and a height of two inches. In order to achieve consistent, accurate, and comparable results from the characterization test(s), it is critical that the tested specimen is in compliance with the shape and dimension requirement set forth by the referenced standard.

Often, in cases where the testing standard requires a cylindrical specimen, the specimen is extracted from a larger structure of material. As shown in FIG. 1, a common method to extract a cylindrical specimen from a larger structure is to use a boring apparatus 100. A general boring apparatus 100 comprises: a vise 108, or other fixed structure or mechanism, to securely hold the material structure 102; a boring drill bit 104; a drilling device 106; and an airline 112. The drilling device 106 is capable of providing rotation to the boring drill bit 104 and may move translationally relative to the vise 108. The relative translation may be achieved by moving the drilling device 106 or the vise 108. The airline 112 is used to cool the boring drill bit 104, to cool the structure 102, and to remove loose particles and powder often produced by the boring process. Additionally, a boring apparatus 100 may contain a buffer material 110, such as wood, placed between the structure 102 and the grips of the vise 108 to provide additional support, increased grip, and more evenly distribute forces between the vise 108 and structure 102.

The boring drill bit 104 is selected to meet the specimen diameter requirement established by an elected standard. Generally, the height of the extracted cylindrical specimen can be specified by using a structure 102 which already possesses the desired extracted specimen cylinder height, or by further processing the extracted cylindrical specimen, for example, buy cutting or facing the specimen, until the specimen meets the established cylinder height requirement.

Unfortunately, the aforementioned process of extracting a cylindrical specimen from a structure 102 using a boring apparatus 100, frequently fails when the structure 102 is 3D-printed, or otherwise has non-uniform surfaces, internal defects, surface defects, or varying morphology. In these cases, the structure 102 may slip, or rotate, in the vise 108, fracture, collapse, deform, or otherwise become untenable for use in a characterization test—even with the presence of a buffer material 110.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Embodiments relate to a method to support a structure for boring and subsequent characterization tests which includes selecting and preparing a casting material, placing the structure, with a structure height, into the casting material which possesses a base side and a casting material height, and allowing for the casting material to set, creating a cast sample with a shape. The method further includes inserting the cast sample into a boring apparatus, boring and extracting a cylindrical specimen from the cast sample, and performing a characterization test on the extracted specimen.

Embodiments relate to a cast sample with an associated shape, which is composed of a non-uniform structure and a casting material. The non-uniform structure is at least partially enveloped by the casting material and the casting material is disposed to protect the non-uniform structure from damage by compressive forces and the casting material does not slip when constricted by a vice by nature of its material or shape.

Embodiments relate to a system for extracting a cylindrical core from a non-uniform structure, comprising: a boring apparatus comprising: a drill press, a boring drill bit, and a vise; a cast sample with an associated shape, the cast sample comprising: a non-uniform structure and a casting material, wherein the non-uniform structure is at least partially enveloped by the casting material and the casting material is disposed to protect the non-uniform structure from damage by compressive forces and the casting material does not slip when constricted by a vice by nature of its material or shape; inserting the cast sample into the boring apparatus; and boring and extracting a cylindrical specimen of the non-uniform structure from the cast sample using the boring drill bit.

Other aspects and advantages of the claimed subject matter will be apparent from the following description and the appended claims.

DETAILED DESCRIPTION

As noted, the characterization of a material, and the evaluation of a materials properties is done with standardized characterization tests, such as those established by the American Society for Testing and Materials (ASTM). The characterization test typically defines the shape and dimension of the test specimen, along with the type of testing apparatus, and testing procedures. The fidelity of the characterization test is heavily dependent on compliance with meeting the specification set forth by the chosen standard.

Figure 1:
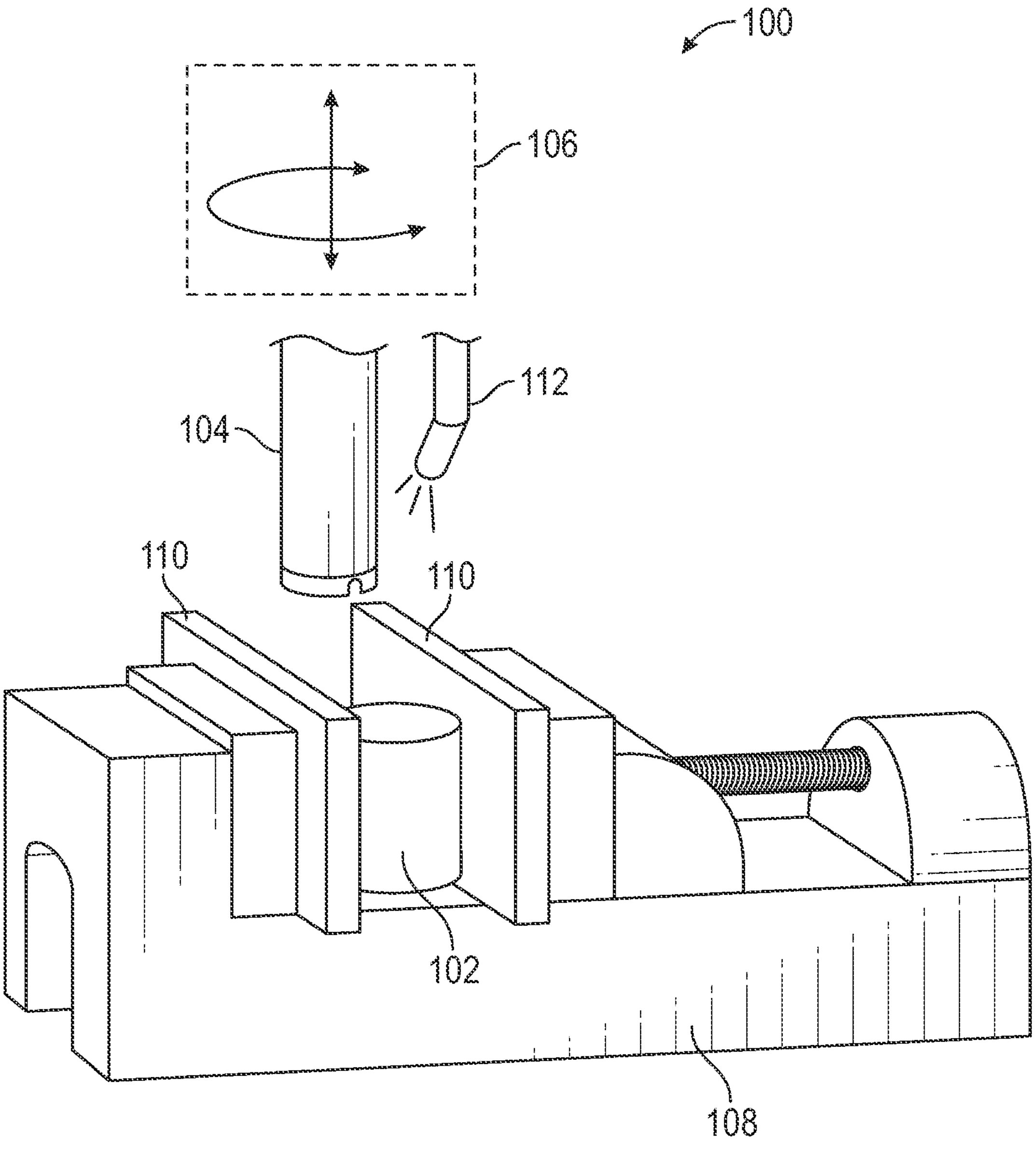
FIG. 1 is a boring apparatus in accordance with one or more embodiments.

Often, in cases where the testing standard requires a cylindrical specimen, the specimen is extracted from a larger structure 102 of material using a boring apparatus 100, as previously described, and as shown in FIG. 1. While intuitive, it is explicitly stated that the specimen is extracted from a larger structure 102 of material. In other words, the boring drill bit 104 inner diameter should not exceed the diameter, or other associated dimension in cases where the shape cannot be described with a diameter, of the structure 102 to be bored.

However, the process of extracting a cylindrical specimen from a structure 102 using a boring apparatus 100, frequently fails when the structure 102 is 3D-printed, or otherwise has non-uniform surfaces, surface defects, or varying morphology. In these cases, the structure 102 may slip, or rotate, in the vise 108, fracture, collapse, deform, or otherwise become untenable for use in a characterization test—even with the presence of a buffer material 110. In particular, structures 102 created through 3D-printing are subject to a wide variety of issues. These issues may include, but are not limited to: warping; inconsistent extrusion; unwanted gaps within the structure; layer separation and splitting; layer shifting; under- and over-extrusion. Additionally, changes in the viscosity of the printed material can cause irregular rheological behavior throughout the structure 102. Moreover, for some materials, such as cementitious materials, water may separate from the material resulting in non-uniform surface morphology and defects. While many issues associated with 3D-printing may be overcome, or mitigated, through careful selection of print settings and proper material preprocessing by a skilled technician, the resulting structures 102 may still possess non-uniformities and other defects either internal to the structure 102 or on the surface of the structure 102. Said non-uniformities, and other defects, greatly limit the ability to securely fasten structures 102 in a boring apparatus 100 without applying undue pressure to the structure 102, or otherwise damaging the structure 102.

Figure 2:
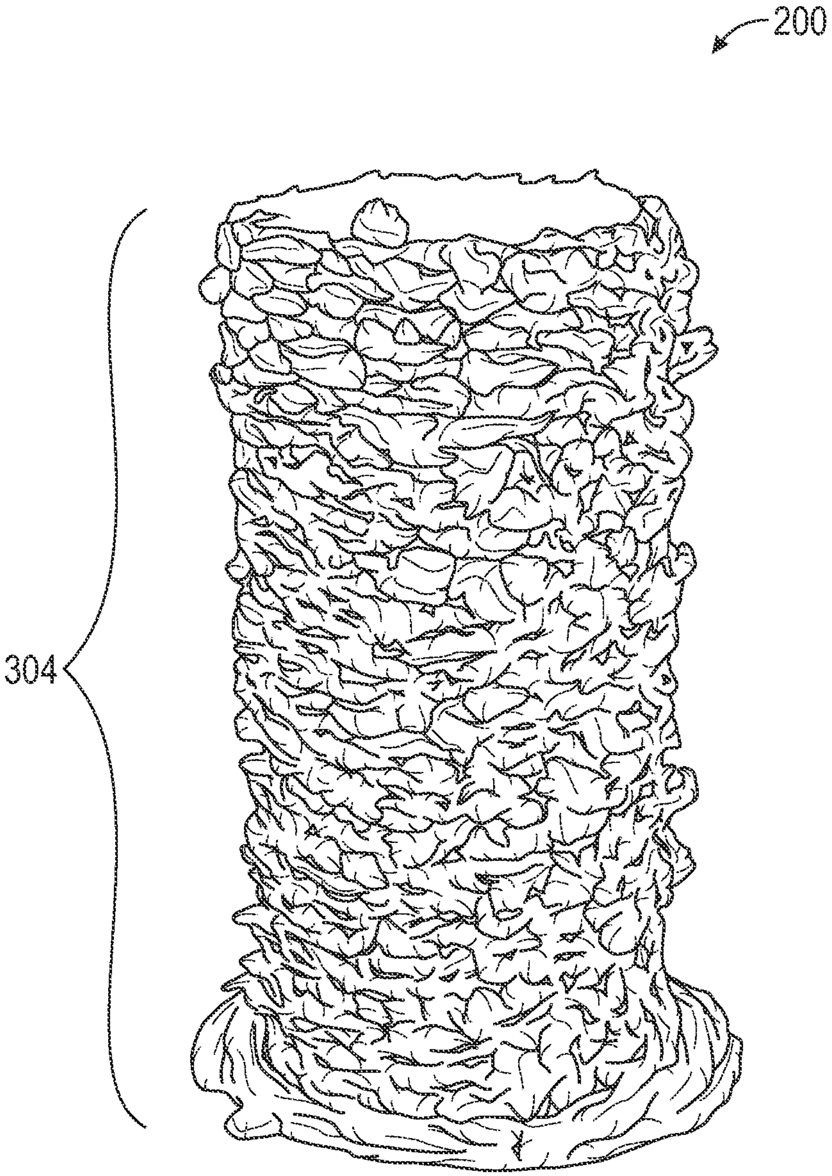
FIG. 2 is an example of a 3D printed cementitious sample.

FIG. 2 demonstrates a 3D-printed cementitious structure 200. As seen, the 3D-printed cementitious structure 200 has an irregular and non-uniform surface. Consequently, when placed in the vise 108 of the boring apparatus 100, the 3D-printed cementitious structure 200 is prone to damage, deformation, or slippage, among other unwanted scenarios, during the boring process. Additionally, due to the non-uniform surface, there is decreased surface contact area between the 3D-printed cementitious structure 200 and the grips of the vise 108 or the buffer material 110.

The structures 102 to be bored, may further be characterized by their "structure height" 304. Herein, the structure height 304 refers to the length of the structure 102 where the axis upon which the length is measured is oriented parallel to the translational axis of the boring device 106. As shown in FIG. 2, the 3D-printed cementitious structure 200 has a structure height 304. The structure height 304 may correspond with the desired cylindrical height of the final extracted specimen, or may be greater than the desired height of the final extracted specimen. In the latter case, it is expected that the extracted specimen will undergo further processing to achieve the desired final cylindrical height. Again, while intuitive, it is explicitly stated that the structure 102 be at least as large as the desired final specimen.

In one aspect, embodiments disclosed herein relate to a method for boring a cylindrical specimen from a 3D-printed structure 301, or other non-uniform structure 102.

In accordance with one or more embodiments, the method comprises placing the 3D-printed structure 301 into a casting material 302. Many choices of casting materials 302 are available, such as, but not limited to, plaster, resin, epoxy, and cement. The selection of a casting material 302 should be made with consideration for the constituents in the 3D-printed structure 301 so that the constituents and the casting material 302 are not chemically or mechanically incompatible. Many casting materials 302 may be suitable for a given 3D-printed structure 301. Additional factors, such as the required set time of the casting material 302 may be considered when selecting a casting material 302.

Once selected, a casting material 302 is prepared according to its associated instructions, as provided by the casting material 302 manufacturer. Once prepared, the casting material 302 is typically a liquid. In accordance with one or more embodiments, the casting material 302 may be poured, or otherwise positioned, into a mold. Note, that the casting material 302 may be prepared in a mold such that no pouring, or positioning, step is required. In some embodiments, the mold shape is an orthotope.

Figure 3:
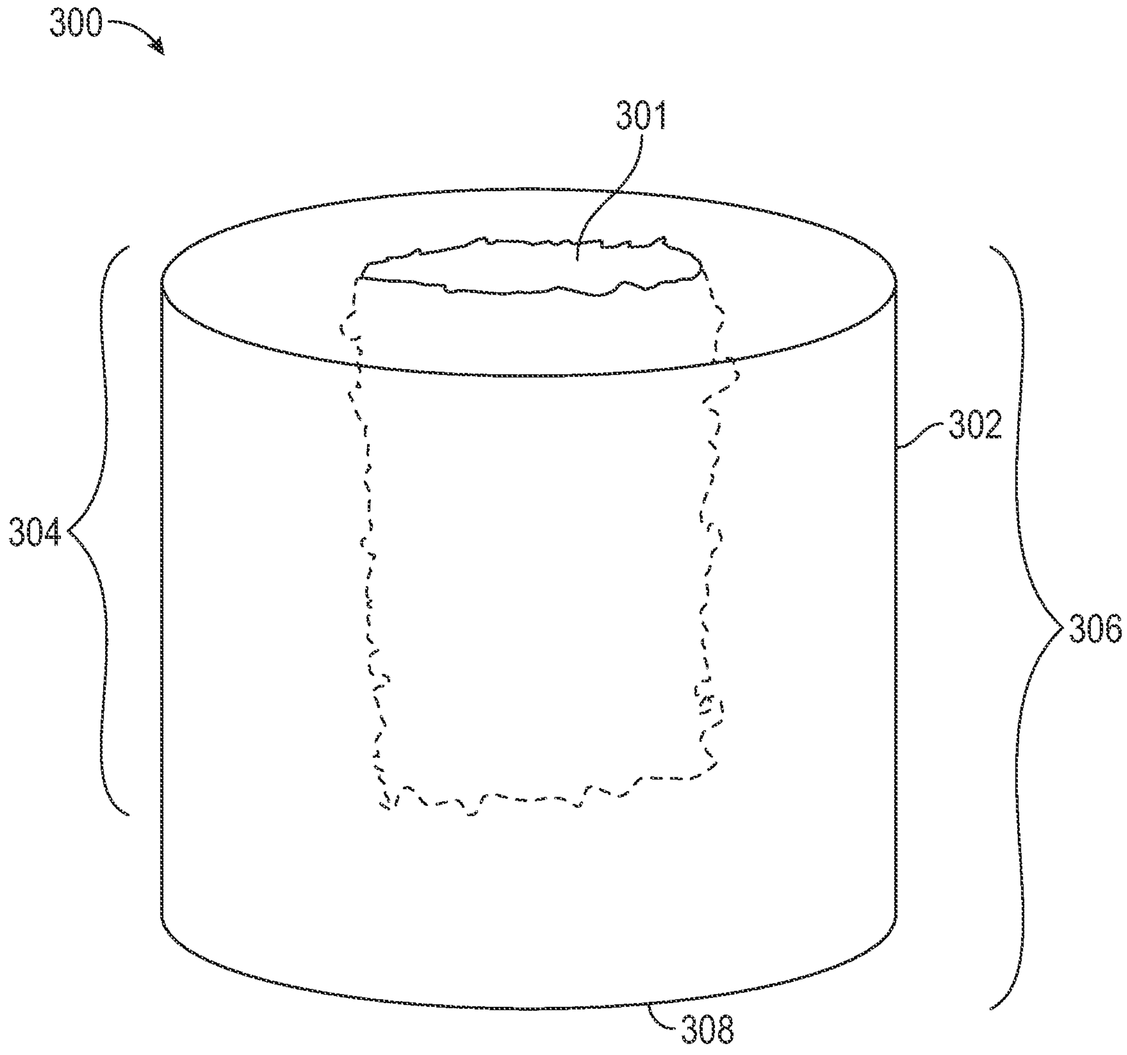
FIG. 3 depicts a cast sample in accordance with one or more embodiments.

In accordance with one or more embodiments, FIG. 3 displays a 3D-printed structure 301 placed within a casting material 302. In this depiction, the casting material 302 is in the shape of a cylinder, either through the use of a mold or by other means. The casting material 302, like unto the 3D-printed structure 301, has a casting material height 306. The casting material height 306 is defined similarly to the structure height 304, wherein the casting material height 306 refers to the length of the casting material 302 where the axis upon which the length is measured is oriented parallel to the translational axis of the boring device 106. The casting material 302 has a base side 308, which is the side of the casting material that will be oriented toward the vise 108 when inserted into the boring apparatus 100. As shown in FIG. 3, the structure height 304 is less than the casting material height 306 such that a layer of casting material 302 resides between the 3D-printed structure 301 and the base side 308 of the casting material 302. One method to place the 3D-printed structure 301 in the casting material 302 so that a layer of casting material 302 resides between the 3D-printed structure 301 and the base side 308 is to allow the casting material 302 to partially set, altering the casting material 302 viscosity, such that the casting material 302 is capable of supporting the 3D-printed structure 301 but still allows for the 3D-printed structure 301 to be placed within the casting material 302. In other embodiments, no layer of casting material 302 resides between the inserted 3D-printed structure 301 and the base side 308.

In some embodiments, the 3D-printed structure 301 may be placed in the casting material 301 by first putting the 3D-printed structure 301 into a mold and then pouring the casting material 301, while the casting material 301 is still a liquid, into the mold and around the 3D-printed structure 301. Regardless of the placement method, once the 3D-printed structure 301 is placed in the casting material 302, the casting material 302 is provided time to fully set. Herein, set time refers to the amount of time for the casting material 302 to harden. Other terms frequently applied to the set time are "cure time" or the time required for the casting material 302 to "solidify". The exact nomenclature used may depend on the type of casting material 302 used and other contextual factors, however, one with ordinary skill in the art will acknowledge that the choice of the term "set" adopted herein should not be considered limiting.

Additional steps during the preparation of the casting material 302, during the placement of the 3D-printed structure 301 in the casting material 302, or throughout the set time period, may be taken to promote a strong bond between the inserted 3D-printed structure 301 and the casting material 302, or to prevent defects from forming in the casting material 302. These steps may include applying vibration to the casting material 302 and 3D-printed structure 301 system, pressurizing said system, applying a vacuum, or negative pressure, to said system, and heating said system. Steps and processes, such as those just described, and more, are well-known in the art; such that they are not explicitly enumerated here without limitation on the scope of the present disclosure.

In some embodiments, the 3D-printed structure 301 may be completely encompassed by the casting material 302. In some embodiments, the 3D-printed structure 301 may protrude from the casting material 302.

Once set, the cast sample 300, which is composed of the 3D-printed structure 301, or more generally, any other non-uniform structure 102, and the casting material 302 may be inserted into the boring apparatus 100 for subsequent boring or stored for later use. It is noted that the cast sample 300 will have an associated shape, likely as a direct result of the choice of mold, or by other means. As an example, and in accordance with one or more embodiments, the cast sample 300 of FIG. 3 has the shape of a cylinder. In other embodiments the shape of the cast sample 300 may be an orthotope.

Depending on the 3D-printed structure 301 material, and casting material 302, proper storage requirements should be followed. For example, a cementitious structure, such as the 3D-printed cementitious structure 200 of FIG. 2 may need to be stored in an aqueous solution to prevent dehydration of the cement. Storage requirements may also be dictated by the choice of casting material 302.

The cast sample 300 may be inserted into the boring apparatus 100 as a "stand-in," or direct replacement, for the original 3D-printed structure 301 without further modification. During boring, standard machining skills are necessary to retrieve a viable cylindrical specimen. The boring process produces mechanical and thermal forces, which are rarely quantified; consequently, a skilled technician should operate the boring apparatus 100. One challenge with the boring process is the mitigation of dust generated during boring. Dust formed between the boring drill bit 104 and the cast sample 300, can erode the encased, or partially encased, 3D-printed structure 301 and apply friction which generates heat. This can contribute to the failure of retrieving a viable cylindrical specimen from the boring process. Therefore, applying fundamental techniques to relieve particle build up and heating, such as the application of air via an airline 112, may be used to cool the cast sample 300 and remove loose particles and powder. Once skilled in the art will appreciate that other machine operation techniques are commonly employed, and their omission here does not limit the scope of this disclosure.

After the extraction of a viable cylindrical specimen, a characterization test may be performed on the specimen, or the specimen may be stored for testing at a later date. Again, proper storage requirements should be followed, such as storing a specimen extracted from a cementitious structure in an aqueous solution.

Figure 4:
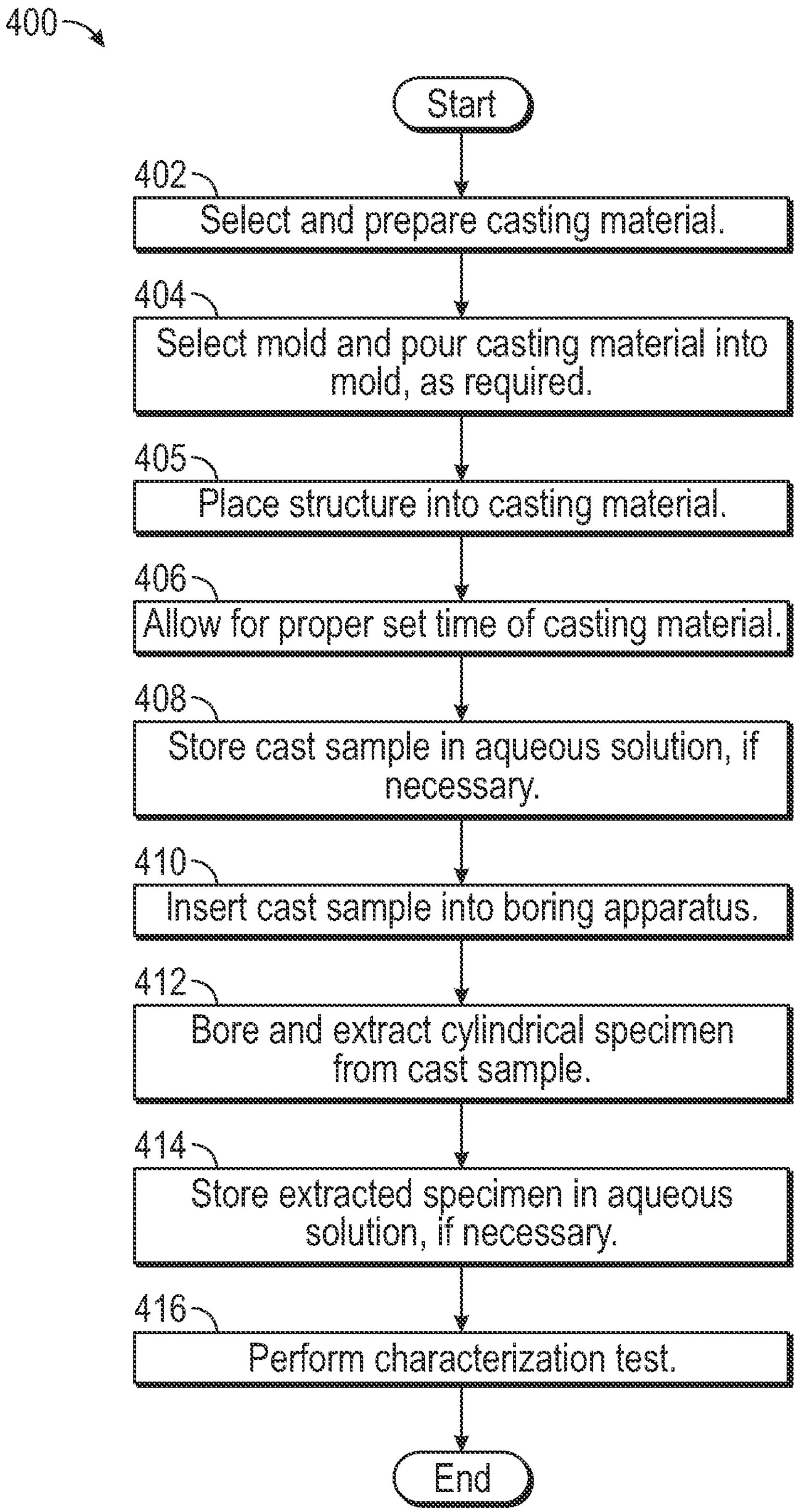
FIG. 4 is a flow chart in accordance with one or more embodiments.

In accordance with one or more embodiments, FIG. 4 depicts a flow chart of the casting and boring process. As previously stated, and as shown in block 402, a suitable casting material 302 is selected and prepared according to the casting material 302 manufacturer's instructions and recommendations. Once prepared, the casting material 302 may be poured, or otherwise positioned, into a mold, if required, according to block 404. In block 405, the 3D-printed structure 301, or more generally, the non-uniform structure 102, is placed in the casting material 302. As noted, there are many ways to place the non-uniform structure 102, or 3D-printed structure 301, into the casting material 302.

As stated in block 406, the casting material 302 is given adequate time to set. If necessary, the cast sample 300 may be stored in an aqueous solution, as described in block 408, or may otherwise be properly stored. Block 410 shows that the cast sample 300 is inserted into the boring apparatus 100. The boring apparatus 100 is used to extract a cylindrical specimen from the cast sample 300 as depicted in block 412. Again, proper storage procedures, such as the storing a cementitious specimen in an aqueous solution, are followed, as acquired, according to block 414. While not explicitly stated, the extracted specimen may require additional post-processing, such as cutting the specimen to the correct cylinder height, to comply with the testing standard. Finally, as stated in block 416, the characterization test is performed on the extracted specimen.

While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

Embodiments of the present disclosure may provide at least one of the following advantages. The casting material 302 can "wrap around" and envelope non-uniformities and surface defects present on the encased, or partially encased, non-uniform structure 102, wherein, the non-uniform structure 102 may be a 3D-printed structure 301. This increases the contact area between the non-uniform structure 102 and casting material 302, which promotes a greater distribution of the forces present during the boring process and reduces the likelihood of slippage between the casting material 302 and the non-uniform structure 102 or between the casting material 302 and the vise 108, or the buffer material 110, if present.

Additionally, stresses from the use of a vise 108 that could cause deformation, cracking, or other damage to the encased, or partially encased, non-uniform structure 102 and the resulting specimen may be transferred and mitigated by the casting material 302. The cast sample 300 may be accepted by the boring apparatus 100 without additional modification. This allows for the direct use of existing boring apparatuses 100 without alteration to established boring procedures. The casting material 302 may also prevent dehydration of the internal structure 102, such as in cases where the structure 102 is cementitious and the casting material 302 is non-permeable and diffusion-limiting, thus eliminating the need to store the cast sample 300 in an aqueous solution; and saving the materials and man-hours associated with this storage requirement. Another advantage provided by some embodiments is that the shape of the cast sample 300 can be an orthotope, via the choice of mold or by other means, which would greatly increase the stability of the cast sample 300 when fixated in a vise 108 during the boring process.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A method comprising:

selecting and preparing a casting material;

placing a structure, with a structure height, into the casting material which possesses a base side and a casting material height, wherein the casting material height is greater than or equal to the structure height such that the casing material substantially envelopes the structure when the structure is placed in the casting material;

allowing for the casting material to set, creating a cast sample with a shape, wherein the cast sample comprises the structure substantially enveloped by the casting material;

inserting the cast sample into a boring apparatus comprising a boring drill bit configured to extract a cylindrical specimen with a diameter;

extracting, with the boring apparatus, the cylindrical specimen from the structure of the cast sample, wherein the extracted cylindrical specimen does not include the casting material; and performing a characterization test on the extracted cylindrical specimen.

2. The method of claim 1, further comprising:

selecting a mold for the casting material; and pouring the casting material into the mold.

3. The method of claim 1, wherein the casting material height is greater than the structure height and a layer of casting material resides between the structure and the base side.

4. The method of claim 1, wherein the structure is a 3D-printed structure.

5. The method of claim 1, wherein the shape of the cast sample is an orthotope.

6. The method of claim 1, further comprising:

storing at least one of the cast sample and the extracted specimen in an aqueous solution.

7. The method of claim 1, wherein the casting material is gypsum cement.

8. The method of claim 1, wherein the boring apparatus comprises:

a drill press;

a vise; and buffer material.

9. The method of claim 1, wherein the diameter of the extracted cylindrical specimen is 1 inch and the extracted cylindrical specimen has a height of 2 inches.

10. The method of claim 1, wherein the characterization test is a standardized test defined by a testing or standardization body.

11. A system for extracting a cylindrical specimen from a non-uniform structure, comprising:

a boring apparatus comprising:

a drill press, a boring drill bit configured to extract the cylindrical specimen with a diameter, and a vise;

a cast sample with an associated shape, the cast sample comprising:

the non-uniform structure and a casting material, wherein the non-uniform structure is substantially enveloped by the casting material and the casting material is disposed to protect the non-uniform structure from damage by compressive forces and the casting material does not slip when constricted by the vise by nature of its material or shape;

wherein the boring apparatus is configured to:

receive the cast sample into the boring apparatus; and extract the cylindrical specimen of the non-uniform structure from the cast sample using the boring drill bit, wherein the extracted cylindrical specimen does not include the casting material.

12. The boring apparatus of claim 11, further comprising a buffer material disposed between the cast sample and the vise when the cast sample is in the boring apparatus.

13. The system of claim 11, wherein the non-uniform structure is a 3D-printed structure.

14. The system of claim 11, wherein the casting material is gypsum cement.

15. The system of claim 11, wherein the diameter of the extracted cylindrical specimen is 1 inch and the extracted cylindrical specimen has a height of 2 inches.

16. The system of claim 11, wherein a characterization test is performed on the extracted cylindrical specimen.

* * * * *